(12) United States Patent
Wang et al.

(10) Patent No.: US 8,048,359 B2
(45) Date of Patent: Nov. 1, 2011

(54) COMPENSATION OF ACTINIC RADIATION INTENSITY PROFILES FOR THREE-DIMENSIONAL MODELERS

(75) Inventors: Hongqing V. Wang, Ft. Mill, SC (US); Soon-Chun Kuek, Rock Hill, SC (US); Charles W. Hull, Santa Clarita, CA (US); Richard Ora Gregory, II, Rock Hill, SC (US); Thomas Alan Kerekes, Calabasas, CA (US)

(73) Assignee: 3D Systems, Inc., Rock Hill, SC (US)

( * ) Notice: Subject to any disclaimer, the term of this patent is extended or adjusted under 35 U.S.C. 154(b) by 138 days.

(21) Appl. No.: 12/254,579

(22) Filed: Oct. 20, 2008

(65) Prior Publication Data
US 2010/0098835 A1 Apr. 22, 2010

(51) Int. Cl.
*B29C 35/04* (2006.01)
(52) U.S. Cl. ............... 264/401; 264/308; 425/174.4
(58) Field of Classification Search ............... 264/401, 264/308; 425/174.4
See application file for complete search history.

(56) References Cited

U.S. PATENT DOCUMENTS

| | | |
|---|---|---|
| 796,159 A | 8/1905 | Smolik |
| 5,049,901 A | 9/1991 | Gelbart et al. |
| 5,182,056 A | 1/1993 | Spence et al. |
| 5,184,307 A | 2/1993 | Hull et al. |
| 5,247,180 A | 9/1993 | Mitcham et al. |
| 5,650,260 A | 7/1997 | Onishi |
| 5,980,913 A | 11/1999 | Penney |
| 6,048,487 A | 4/2000 | Almquist et al. |
| 6,051,179 A | 4/2000 | Hagenau |
| 6,369,814 B1 | 4/2002 | Dorbie |
| 6,391,245 B1 | 5/2002 | Smith |
| 6,500,378 B1 | 12/2002 | Smith |
| 6,544,698 B1 | 4/2003 | Fries |
| 6,665,048 B2 | 12/2003 | Gelbart et al. |

(Continued)

FOREIGN PATENT DOCUMENTS

DE 9319405 3/1994

(Continued)

OTHER PUBLICATIONS

IEIC Technical Report dated Sep. 2001 by K Takahashi entitled "A New Application of DMD to Photolithography and Rapid Prototyping System".

(Continued)

*Primary Examiner* — Joseph Del Sole
*Assistant Examiner* — James Sanders
(74) *Attorney, Agent, or Firm* — Keith A. Roberson

(57) ABSTRACT

There is provided methods and apparatus for compensation of intensity profiles of imagers used in three-dimensional modelers. The intensity profile of the actinic radiation projected from the imager is determined by a variety of techniques, including but not limited to manually operated sensors, exposed and scanned actinic radiation-sensitive paper, and intensity profilers. Once the intensity profile of the imager is determined, each layer of the solidifiable liquid material is cured by projecting a plurality of patterns (as opposed to a single pattern) defining the two-dimensional cross-section of the part being cured. The patterns vary in duration, number, and/or shape to correlate to the intensity profile so that a single layer of selectively cured solidifiable liquid material is cured with a substantially equivalent (or otherwise controlled) amount of actinic radiation per unit of surface area to provide generally controlled and consistent part quality.

12 Claims, 18 Drawing Sheets

U.S. PATENT DOCUMENTS

| | | |
|---|---|---|
| 6,855,482 B2 | 2/2005 | McLean et al. |
| 6,942,830 B2 | 9/2005 | Mulhaupt et al. |
| 6,995,830 B2 | 2/2006 | de Jager |
| 6,998,219 B2 | 2/2006 | Fries |
| 7,052,263 B2 | 5/2006 | John et al. |
| 7,088,432 B2 | 8/2006 | Zhang |
| 7,162,323 B2 | 1/2007 | Brumback et al. |
| 7,195,472 B2 | 3/2007 | John et al. |
| 7,358,283 B2 | 4/2008 | Xu |
| 7,362,355 B1 | 4/2008 | Yang et al. |
| 7,573,561 B2 | 8/2009 | Fries |
| 7,636,610 B2 | 12/2009 | Schillen et al. |
| 2002/0155189 A1 | 10/2002 | John |
| 2003/0074096 A1 | 4/2003 | Das et al. |
| 2004/0075882 A1 | 4/2004 | Meisburger |
| 2005/0023710 A1 | 2/2005 | Brodkin et al. |
| 2005/0056791 A1* | 3/2005 | Donaghue et al. ............ 250/394 |
| 2005/0248062 A1 | 11/2005 | Shkolnik et al. |
| 2005/0259785 A1 | 11/2005 | Zhang |
| 2005/0288813 A1 | 12/2005 | Yang et al. |
| 2006/0239588 A1 | 10/2006 | Hull et al. |
| 2006/0249884 A1 | 11/2006 | Partanen et al. |
| 2007/0259066 A1 | 11/2007 | Sperry et al. |
| 2007/0260349 A1 | 11/2007 | John et al. |
| 2008/0021586 A1 | 1/2008 | Schillen et al. |
| 2008/0038396 A1 | 2/2008 | John et al. |
| 2008/0054531 A1 | 3/2008 | Kerekes et al. |
| 2008/0113293 A1 | 5/2008 | Shkolnik et al. |
| 2008/0169586 A1 | 7/2008 | Hull et al. |
| 2008/0169589 A1 | 7/2008 | Sperry et al. |
| 2008/0170122 A1 | 7/2008 | Hongo et al. |
| 2008/0179785 A1 | 7/2008 | Hammond et al. |
| 2008/0179787 A1 | 7/2008 | Sperry et al. |
| 2008/0181977 A1 | 7/2008 | Sperry et al. |
| 2008/0206383 A1 | 8/2008 | Hull et al. |
| 2008/0217818 A1 | 9/2008 | Holmboe et al. |
| 2008/0226346 A1 | 9/2008 | Hull et al. |
| 2009/0133800 A1* | 5/2009 | Morohoshi et al. ............ 156/58 |
| 2009/0146344 A1 | 6/2009 | El-Siblani |
| 2009/0191489 A1 | 7/2009 | Sandstrom |
| 2010/0125356 A1 | 5/2010 | Shkolnik et al. |

FOREIGN PATENT DOCUMENTS

| | | |
|---|---|---|
| DE | 29911122 | 9/1999 |
| DE | 19929199 | 1/2001 |
| DE | 19957370 | 6/2001 |
| DE | 69909136 | 5/2004 |
| DE | 102006019963 | 10/2007 |
| EP | 0676275 | 10/1995 |
| EP | 1156922 | 11/2001 |
| EP | 1250997 | 4/2002 |
| EP | 1270185 | 1/2003 |
| EP | 1192041 | 3/2003 |
| EP | 1849587 | 10/2007 |
| FR | 2692053 | 12/1993 |
| WO | 9515841 | 6/1995 |
| WO | 9600422 | 1/1996 |
| WO | WO 9600422 | 1/1996 |
| WO | WO 9841944 | 9/1998 |
| WO | WO 0140866 | 6/2001 |
| WO | 0133511 | 10/2001 |
| WO | WO 03/059184 | 7/2003 |
| WO | WO 2005110722 | 11/2005 |

OTHER PUBLICATIONS

A Thesis dated Jun. 2008 by Jonathan Zyzalo, "Masked Projection Stereolithography: Improvement of the Limaye Model for Curing Single Layer Medium Sized Parts" (pp. i-xiii; 1-75).

A Thesis dated Jun. 2008 by Jonathan Zyzalo, "Masked Projection Stereolithography: Improvement of the Limaye Model for Curing Single Layer Medium Sized Parts" (pp. 76-168).

A Thesis dated Jun. 2008 by Jonathan Zyzalo, "Masked Projection Stereolithography: Improvement of the Limaye Model for Curing Single Layer Medium Sized Parts" (pp. 169-260).

U.S. Appl. No. 12/203,177, filed Sep. 3, 2008.

PCT International Search Report for International Application No. PCT/US2009/061159.

PCT Written Opinion of International Search Authority for International Application No. PCT/US/2009/061159.

Chen et al. article "Gray-scale photolithography using microfluidic photomasks" dated Feb. 18, 2003, PNAS, vol. 100, No. 5, pp. 1499-1504.

Lu et al. article "A digital micro-mirror device-based system for the microfabrication of complex, spatially patterned tissue engineering scaffolds" published on-line Jan. 27, 2006 on Wiley Interscience (www.interscience.wiley.com), pp. 396-405.

Sun et al. article "Projection micro-stereolithography using digital micro-mirror dynamic mask" available on-line Mar. 16, 2005 at www.sciencedirect.com, pp. 113-120.

European Search Report for European Patent Application No. EP 06251473.2, dated Jan. 31, 2008 (4 pages).

European Search Report for European Patent Application No. EP 06251474.0, dated Jan. 31, 2008 (4 pages).

European Search Report for European Patent Application No. EP 07016909.9 dated Jan. 15, 2008 (9 pgs).

English translation of DE 19957370.

English translation of EP 1192041.

English translation of EP 1849587.

English translation of FR 2692053.

English translation of WO 2005110722.

* cited by examiner

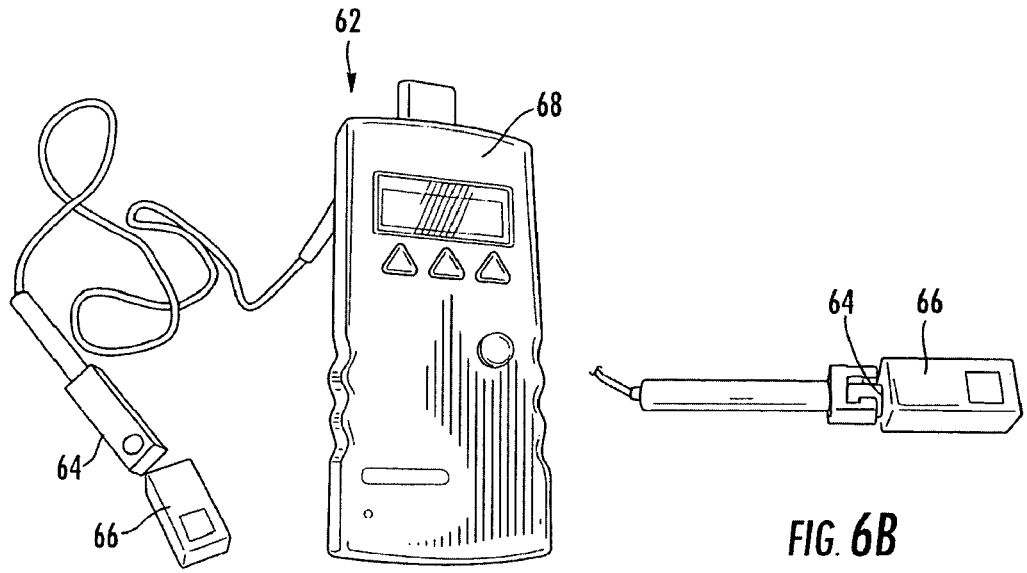
FIG. 6A
FIG. 6B
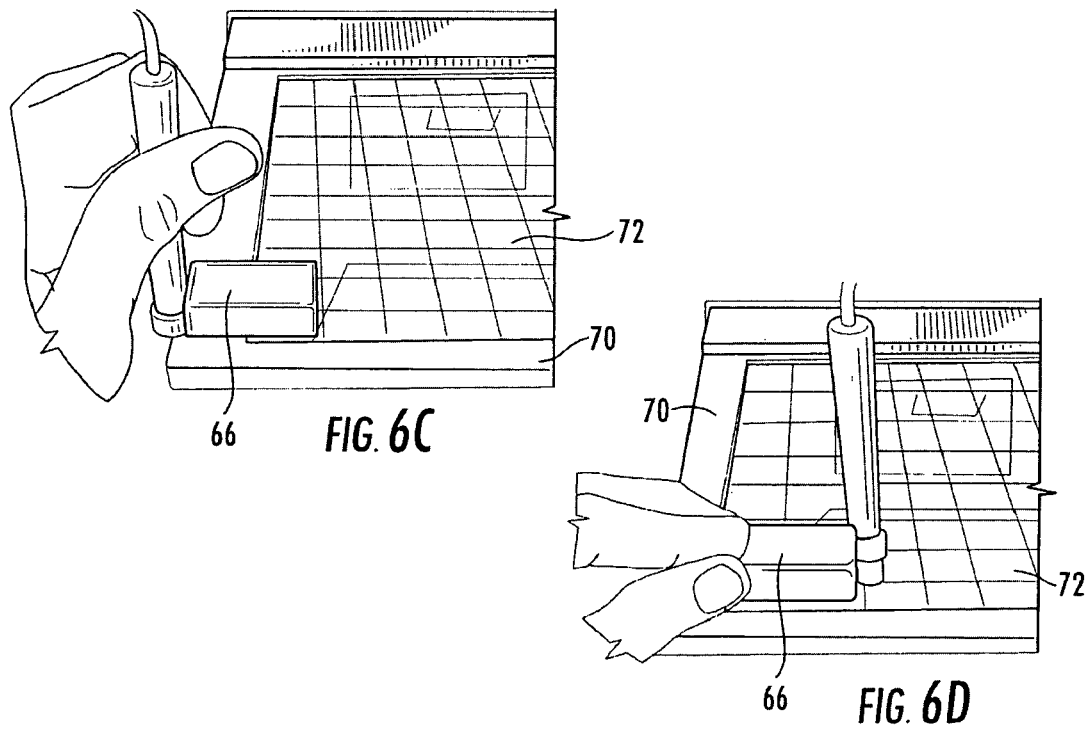
FIG. 6C
FIG. 6D

| 4.47 | 6.29 | 7.17 | 7.57 | 7.32 | 8.15 | 8.91 | 9.80 | 9.41 | 8.62 | 7.50 | 6.08 |
| 4.29 | 5.58 | 7.01 | 7.02 | 7.40 | 8.25 | 9.16 | 10.12 | 9.19 | 9.20 | 8.19 | 6.66 |
| 6.59 | 8.14 | 9.00 | 9.6 | 9.85 | 10.46 | 10.41 | 10.37 | 9.75 | 8.85 | 7.88 | 6.77 |
| 6.09 | 7.38 | 8.22 | 9.08 | 9.68 | 10.38 | 10.72 | 10.63 | 10.30 | 9.52 | 8.65 | 7.45 |
| 9.54 | 10.71 | 11.49 | 11.57 | 11.67 | 11.21 | 10.50 | 9.72 | 9.01 | 8.18 | 7.36 | 6.58 |
| 8.49 | 9.63 | 10.49 | 10.74 | 11.10 | 10.15 | 10.45 | 9.98 | 9.42 | 8.69 | 8.05 | 7.48 |
| 9.17 | 10.60 | 11.43 | 11.47 | 11.23 | 11.07 | 10.84 | 10.32 | 9.54 | 8.62 | 7.82 | 6.81 |
| 8.05 | 9.48 | 10.41 | 10.64 | 10.15 | 10.82 | 10.94 | 10.60 | 10.03 | 9.39 | 8.72 | 7.74 |
| 9.19 | 10.32 | 11.06 | 11.15 | 11.27 | 10.77 | 9.99 | 9.17 | 8.41 | 7.62 | 6.79 | 6.32 |
| 8.05 | 9.26 | 9.94 | 10.43 | 10.73 | 10.47 | 9.94 | 9.38 | 8.83 | 8.19 | 7.57 | 7.70 |
| 8.43 | 9.31 | 9.97 | 10.11 | 10.09 | 9.76 | 9.09 | 8.55 | 7.79 | 6.92 | 6.14 | 5.74 |
| 7.37 | 8.34 | 9.04 | 9.43 | 9.59 | 9.49 | 9.12 | 8.76 | 8.18 | 7.44 | 6.90 | 6.62 |
| 7.32 | 8.26 | 8.74 | 8.90 | 8.79 | 8.64 | 8.22 | 7.76 | 7.40 | 6.32 | 5.64 | 5.13 |
| 6.16 | 7.36 | 7.97 | 8.32 | 8.41 | 8.46 | 8.28 | 8.00 | 7.46 | 6.81 | 6.75 | 5.43 |
| 6.32 | 7.15 | 7.58 | 7.84 | 7.72 | 7.65 | 7.38 | 7.04 | 6.39 | 5.74 | 5.18 | 4.76 |
| 5.65 | 6.39 | 6.94 | 7.30 | 7.44 | 7.49 | 7.45 | 7.24 | 6.76 | 6.23 | 5.74 | 5.45 |
| 4.19 | 5.66 | 6.42 | 6.62 | 6.77 | 6.76 | 6.58 | 6.30 | 6.82 | 5.26 | 4.63 | 4.05 |
| 3.80 | 5.24 | 5.90 | 6.34 | 6.49 | 6.67 | 6.64 | 6.49 | 6.13 | 5.65 | 5.11 | 4.18 |

COMPENSATION OF ACTINIC RADIATION INTENSITY PROFILES FOR THREE-DIMENSIONAL MODELERS

FIELD OF THE INVENTION

The present invention is related to the creation of parts using a three-dimensional modeler, and more particularly, to methods and apparatus for providing substantially consistent and/or controlled curing of the solidifiable liquid material.

BACKGROUND OF THE INVENTION

A number of additive manufacturing technologies presently exist for the rapid creation of models, prototypes, and parts for limited run manufacturing or other applications. Such parts can be made using solid freeform fabrication techniques, which include but are not limited to stereolithography, selective deposition modeling, laminated object manufacturing, selective phase area deposition, multi-phase jet solidification, ballistic particle manufacturing, fused deposition modeling, particle deposition, laser sintering, film transfer imaging, and the like. Some, but not all, of these techniques are performed by three-dimensional modelers that provide a layer of solidifiable liquid material and project a two-dimensional image of actinic radiation upon the material to selectively cure the material to define a cross-sectional area of the part to be produced. This process of providing layers of solidifiable liquid material and selectively curing the material with actinic radiation is repeated until a part is produced. As used herein, "actinic radiation" includes any and all electromagnetic radiation that produces a photochemical reaction in the material that is exposed to the electromagnetic radiation. Such actinic radiation includes, but is not limited to, radiation that results in cross-linking of any radiocrosslinkable material that absorbs the radiation. Examples of actinic radiation include, but are not limited to ultraviolet radiation, visible light, and infrared radiation.

Example three-dimensional modelers are disclosed in US Patent Publication Numbers 2008/0206383 and 2008/0169589 that are assigned to the present assignee and are incorporated by reference herein in their entireties. These three-dimensional modelers utilize the film transfer imaging technique to provide single layers of solidifiable liquid material proximate the image plane and selectively cure the material with actinic radiation projected from an imager. FIG. 1 illustrates such a prior art three-dimensional modeler 10 in which a single layer of solidifiable liquid material 12 is provided via a transfer film 14 to proximate an image plane 16. The material 12 is supplied in a replaceable cartridge 18. An imager (see imager 20 of FIG. 2) projects a two-dimensional pattern of actinic radiation from beneath the image plane 16 and through the image plane and the film 14 to selectively cure the solidifiable liquid material 12 on the upper surface of the film.

After a pattern of material 12 corresponding to the respective cross-section of the part being produced has been selectively cured a desired amount, the build platform 22 (which is connected to the part being produced) is raised to separate the cured pattern of material from the film. The film and any uncured solidifiable liquid material 12 are returned to the cartridge and then the film is pulled another time across the image plane to once again provide a complete single layer of solidifiable liquid material proximate the image plane and the process is repeated until the part is produced.

As stated above, the imager projects a two-dimensional pattern of actinic radiation that corresponds to the respective cross-section of the part being produced. However, certain imagers do not project an equivalent amount of actinic radiation over the two-dimensional area of the image plane and/or the amount of actinic radiation that is projected by the imager diminishes over time. Therefore, three-dimensional modelers having such imagers may produce parts that possess undesirable part qualities (aesthetic and/or structural) resulting from over-curing and/or under-curing of the material selectively cured to form the part.

BRIEF SUMMARY OF THE INVENTION

The present invention provides methods and apparatus for three-dimensional modelers to compensate for imager performance. More particularly, the methods and apparatus of the present invention provide for controlled use of imagers that provide varied amounts of actinic radiation over the two-dimensional area of the image plane and/or imagers that provide varied amounts of actinic radiation over a period of time. Certain embodiments of the present invention determine an intensity profile of the actinic radiation projected by the imager to provide a plurality of patterns of actinic radiation to selectively cure the layer of solidifiable liquid material, rather than provide a single pattern of actinic radiation corresponding to the complete cross-section as conventional three-dimensional modelers typically do. In addition, other embodiments of the present invention adjust the position of the part, relative to the image plane, based upon the intensity profile in order to reduce the build time for parts produced by the three-dimensional modeler.

One exemplary method of the present invention includes determining the intensity profile of the actinic radiation projected from the imager and projecting a plurality of patterns of actinic radiation per single layer of solidifiable liquid material provided proximate the image. The plurality of patterns of actinic radiation are substantially correlated to the intensity profile of the actinic radiation in order for the single layer of solidifiable liquid material to be cured with a substantially equivalent amount of actinic radiation per unit of surface area. The plurality of patterns are exposed for different durations based upon the various intensities of the actinic radiation, are numbered based upon the difference between the highest intensity and the lowest intensity of the intensity profile, and/or are shaped based upon the intensity profile. By correlating the plurality of patterns of actinic radiation to the determined intensity profile, the imager is able to project a substantially equivalent or controlled amount of actinic radiation per unit of surface area for a single layer of solidifiable liquid material so that the parts produced by the three-dimensional modeler are of known and controlled quality.

Another exemplary embodiment of the present invention determines the intensity profile of the actinic radiation projected from the imager and positions a center of the part (or a center of a plurality of parts, if applicable) proximate a portion of the intensity profile defining the highest intensity of the actinic radiation. Positioning the part where the greatest intensity of actinic radiation is projected will generally enable the three-dimensional modeler to produce the part more quickly by requiring less time to selectively cure each layer of the part (regardless of the number of patterns projected for each layer). Conventional three-dimensional modelers typically default the position of the part at the center of the image plane or at a corner or side of the image plane regardless of the intensity of the actinic radiation, so positioning the part where the highest intensity of actinic radiation is projected will enable the part to be produced faster, thus increasing the throughput of the three-dimensional modeler.

Various embodiments of the present invention include methods for determining the intensity profile of the actinic radiation projected by the imager. The intensity profile may be measured using a manually-operated sensor positioned proximate the image plane, such as by moving a probe along a two-dimensional grid, to collect the sensor read-outs for each section of the grid and manually enter the intensity profile into the control system for the three-dimensional modeler. Alternatively, an actinic radiation-sensitive material, such as light-sensitive printing paper, may be exposed to the actinic radiation of the imager such that the material displays a gradient that represents the intensity profile. The exposed actinic radiation-sensitive material may then be scanned to measure the gradient and thereby determine the intensity profile. A further alternative approach to determining the intensity profile is to directly project the actinic radiation onto the scanner, such as a flat bed scanner. This may be performed by temporarily placing the scanner proximate the image plane of the three-dimensional modeler. Such methods for determining the intensity profile may be performed at any time, such as prior to installation of an imager into a modeler, during assembly of the imager into the modeler, once the modeler has been installed at the end-user's location, and/or periodically after the modeler has been used a certain amount of time by the end-user.

Still further embodiments of the present invention include an intensity profiler within the three-dimensional modeler to allow automatic determination of the intensity profile and/or automatic monitoring of the intensity profile to determine overall changes in the intensity of the imager and/or changes in the intensity profile itself. Such an intensity profiler is generally housed within or on the three-dimensional modeler and is positioned such that it is able to measure the intensity profile but such that it will not adversely affect the selective curing of the solidifiable liquid material of which the parts are produced.

Still further embodiments of the invention include additional methods and apparatus for improved curing of solidifiable liquid material as disclosed in the detailed description below.

BRIEF DESCRIPTION OF THE SEVERAL VIEWS OF THE DRAWINGS

Figure 1:
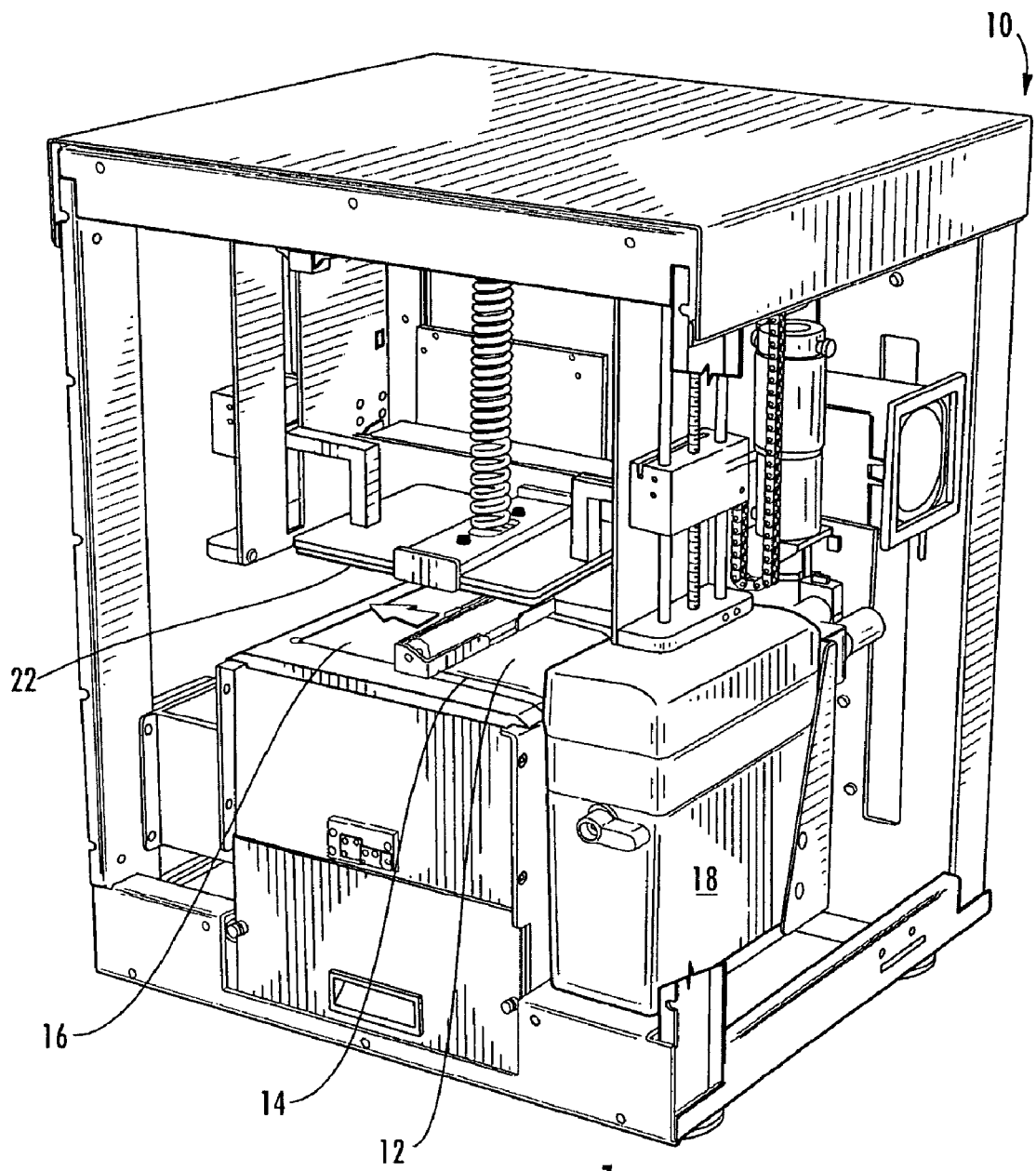
Figure 2:
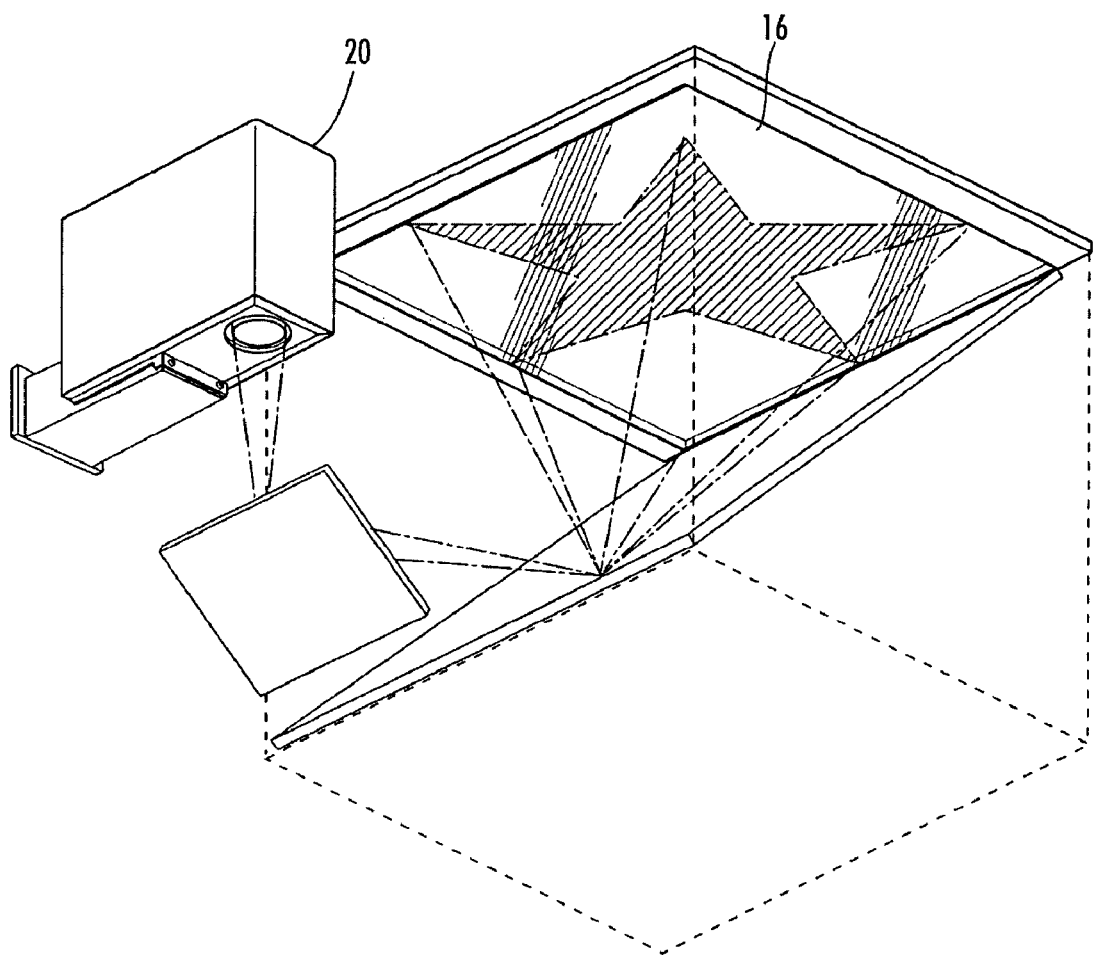
Figure 3:
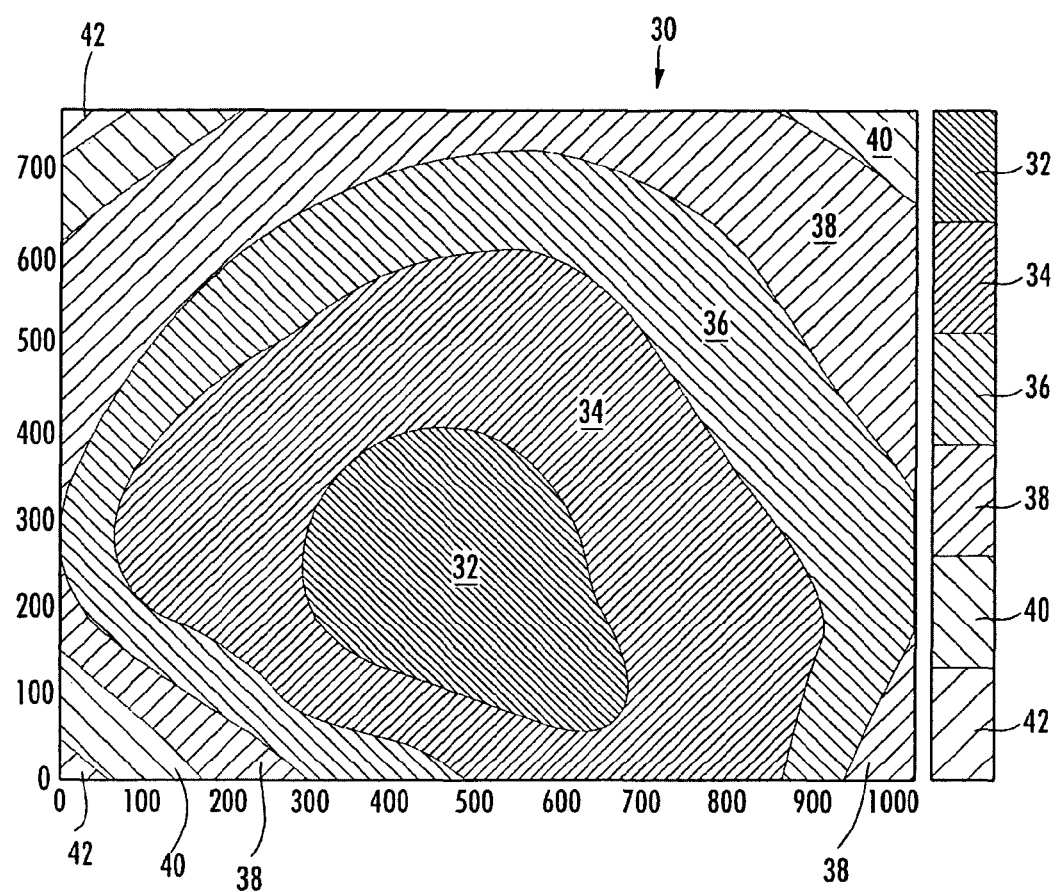
Figure 5A:
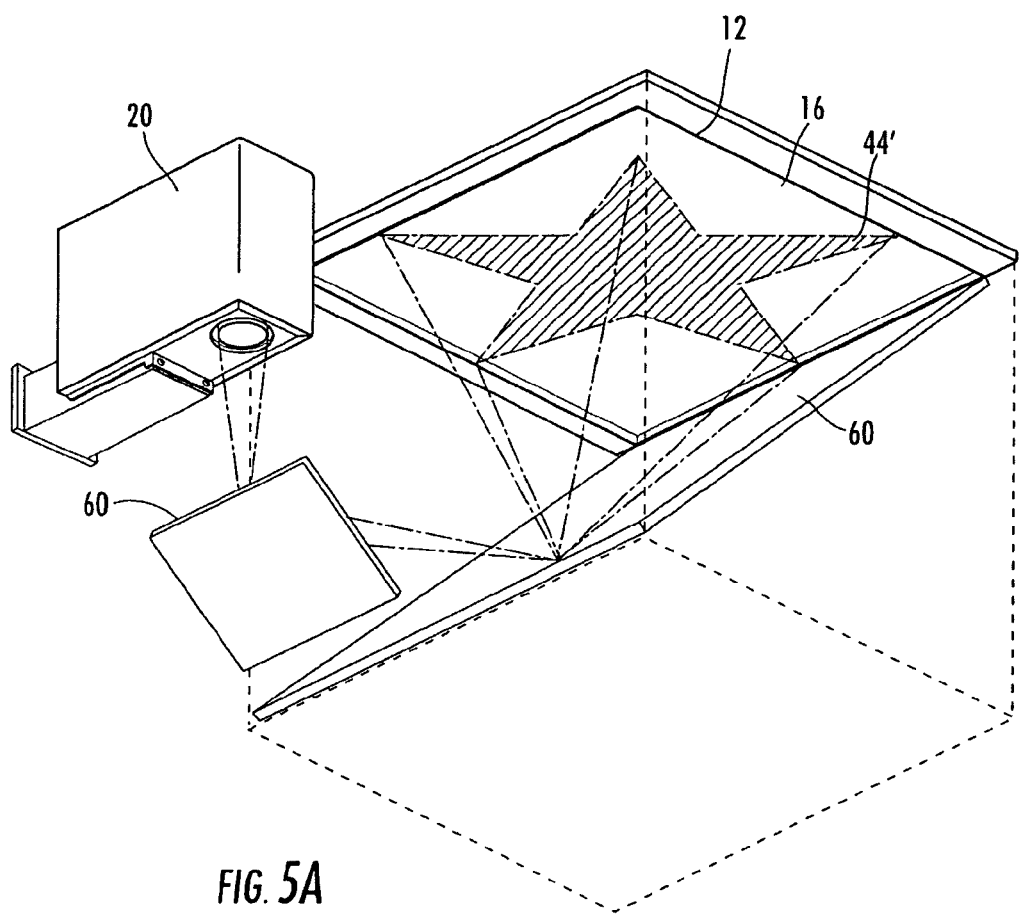
Figure 5B:
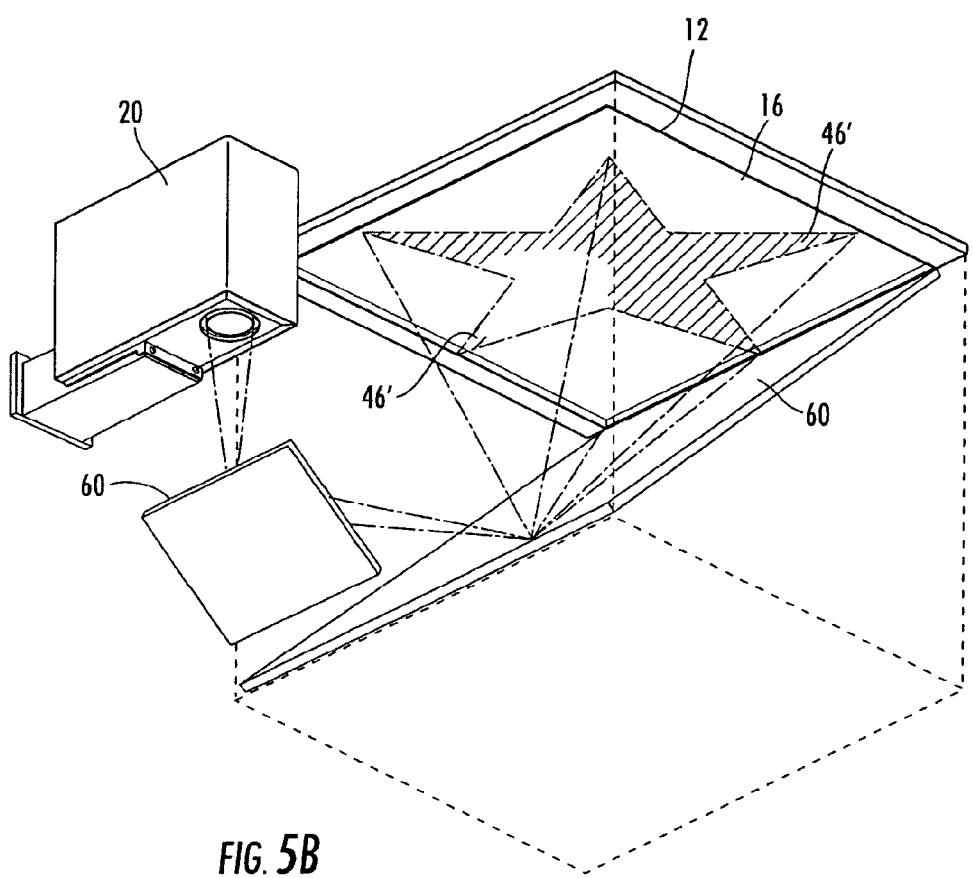
Figure 5C:
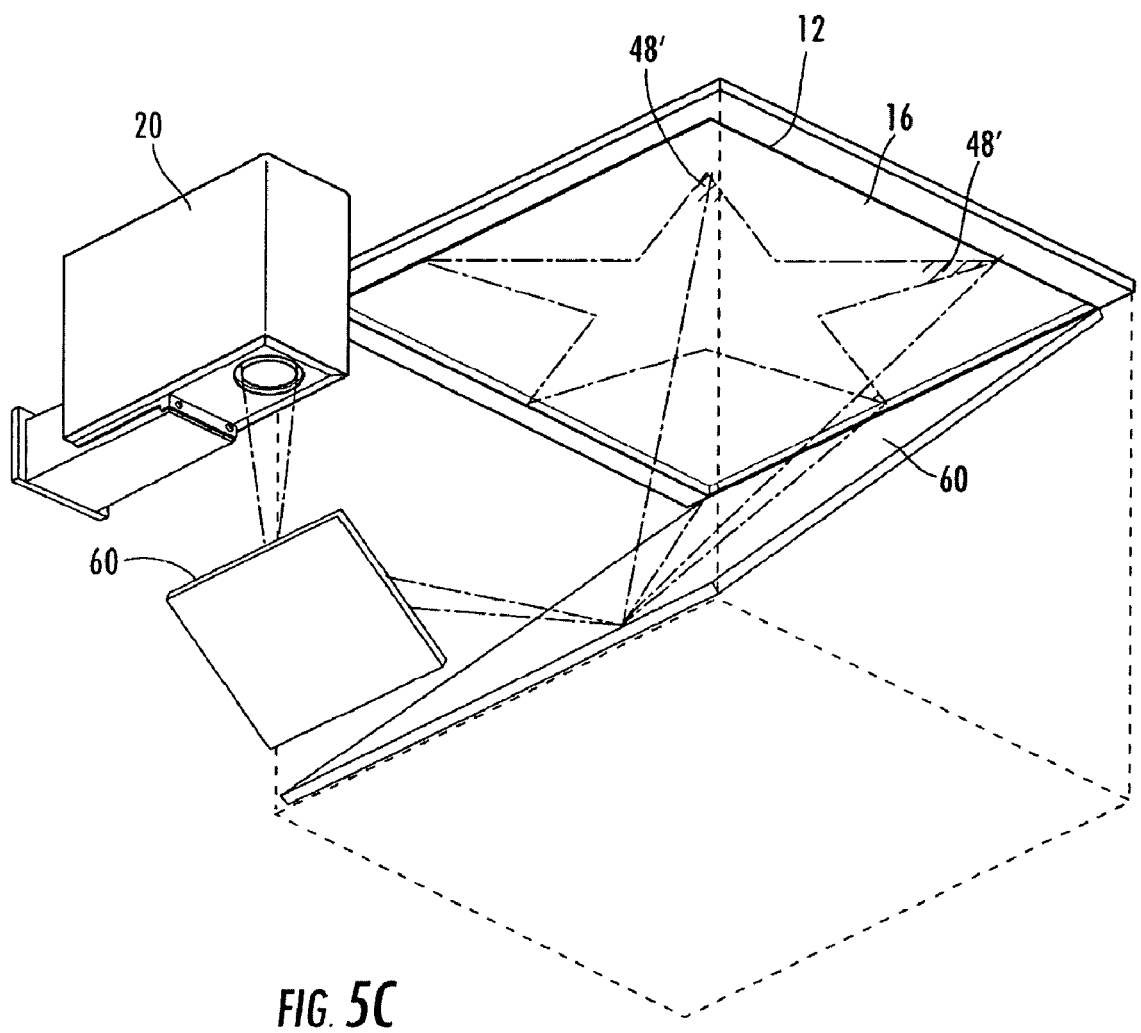
Figure 7:
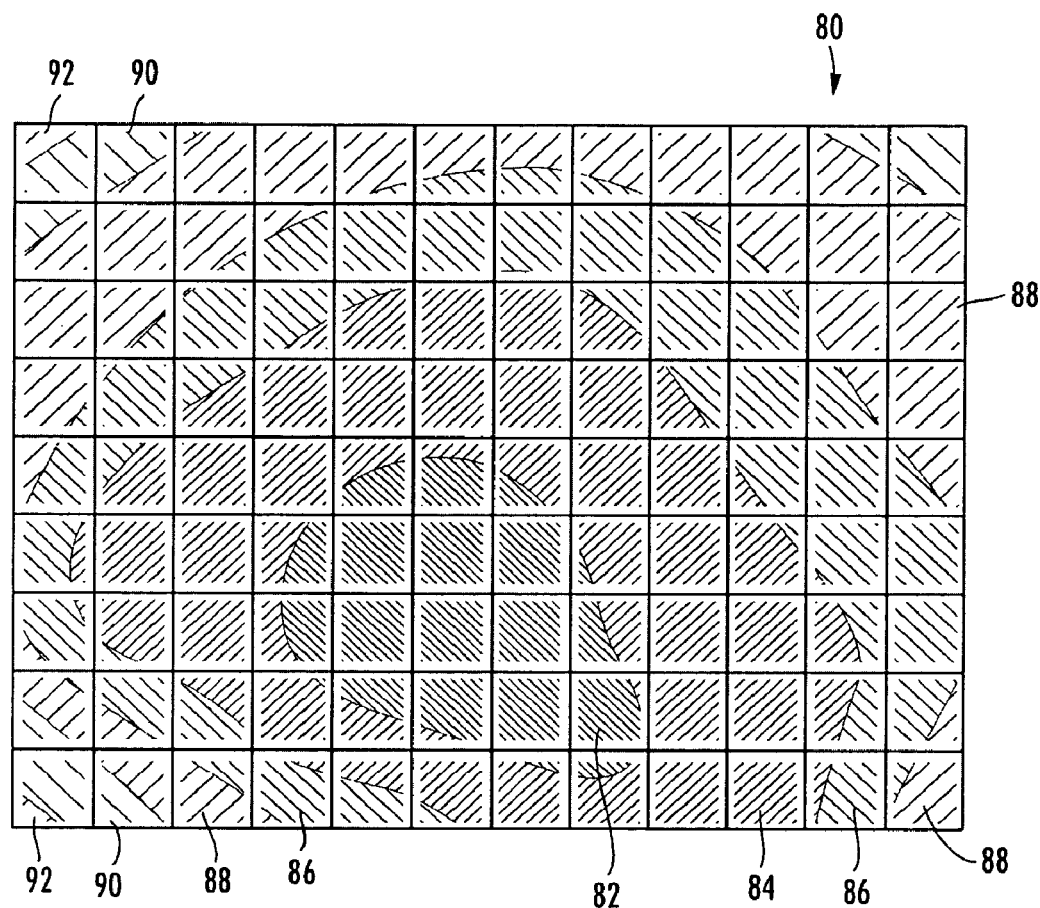
Figure 8:
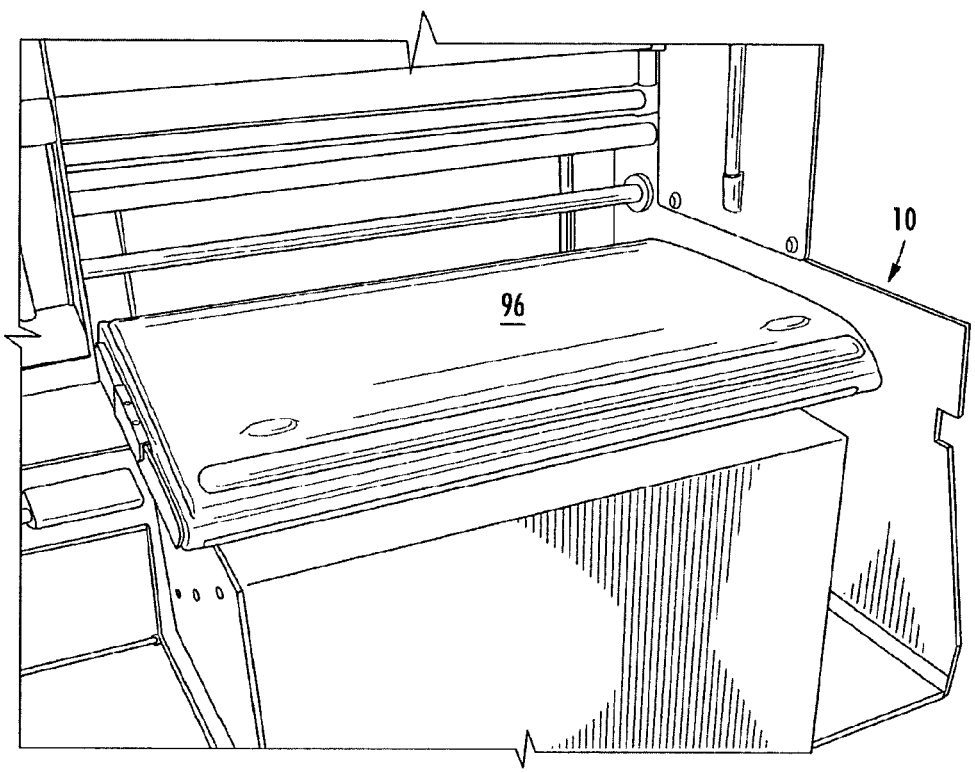
Figure 9A:
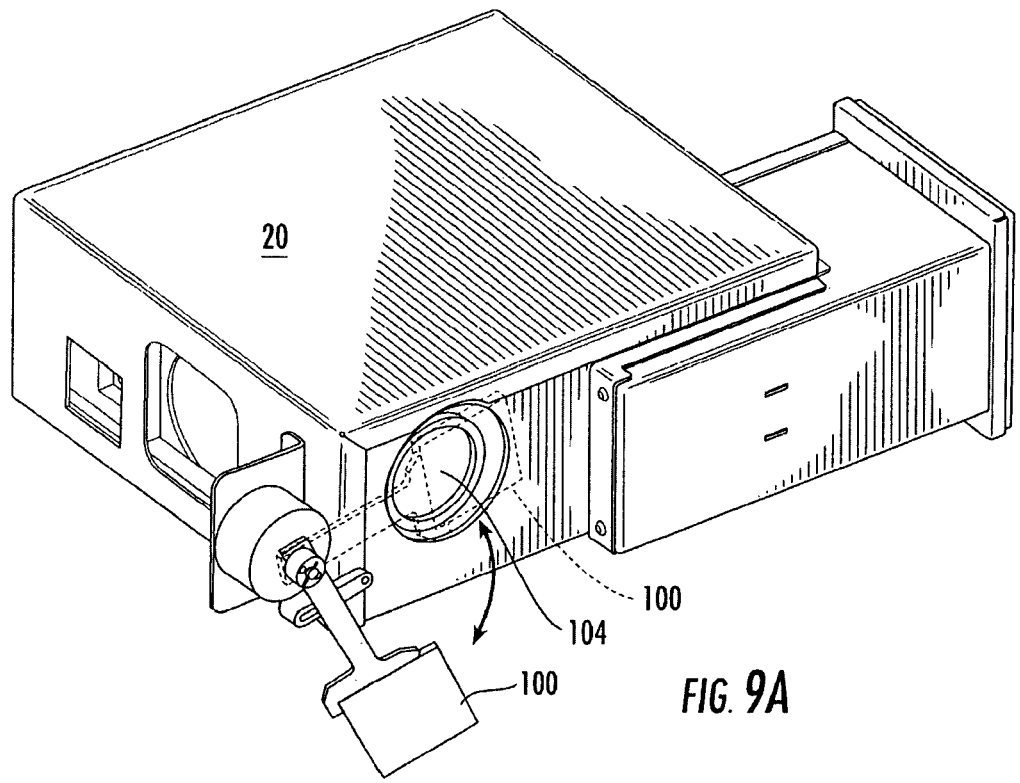
Figure 9B:
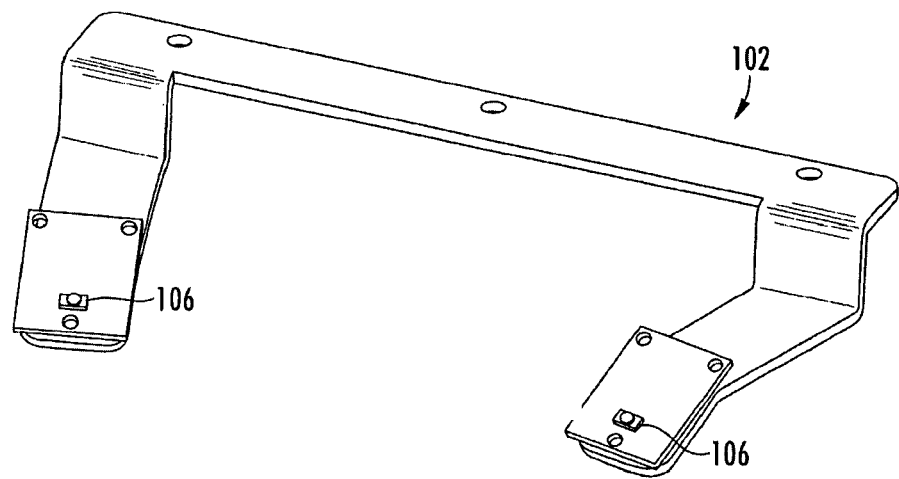
Figure 9C:
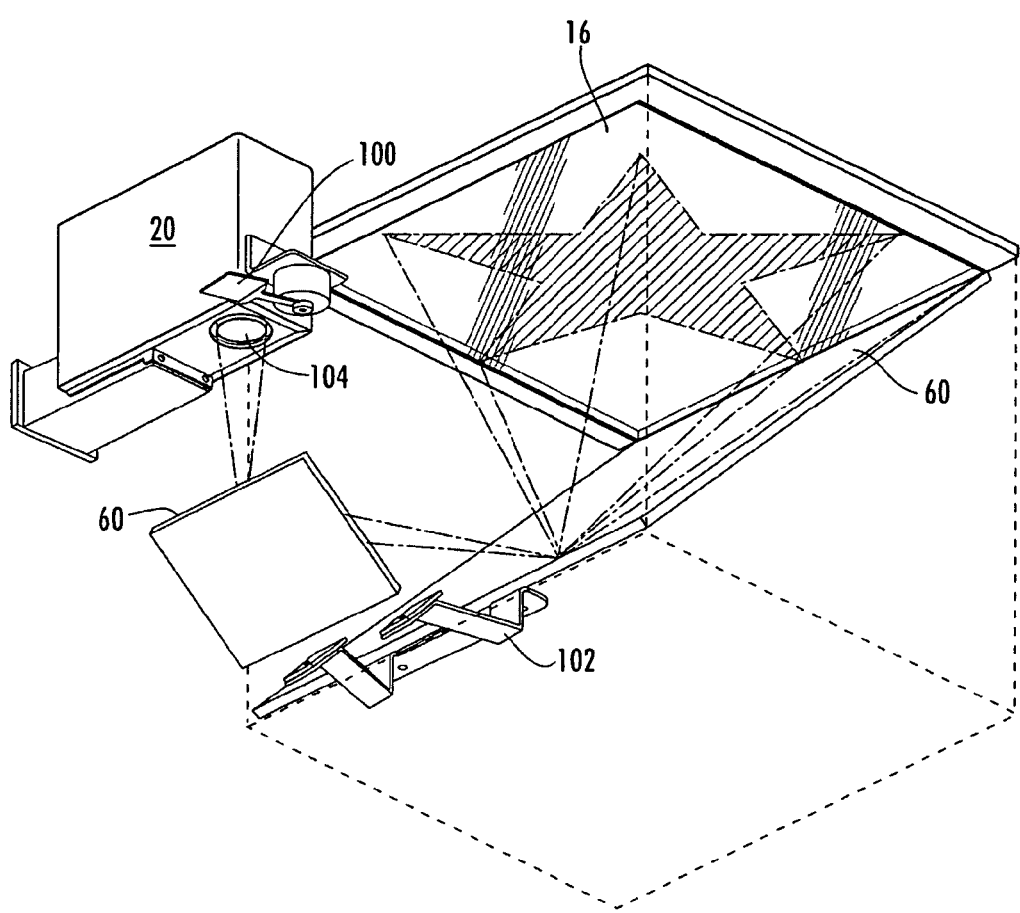
Figure 10A:
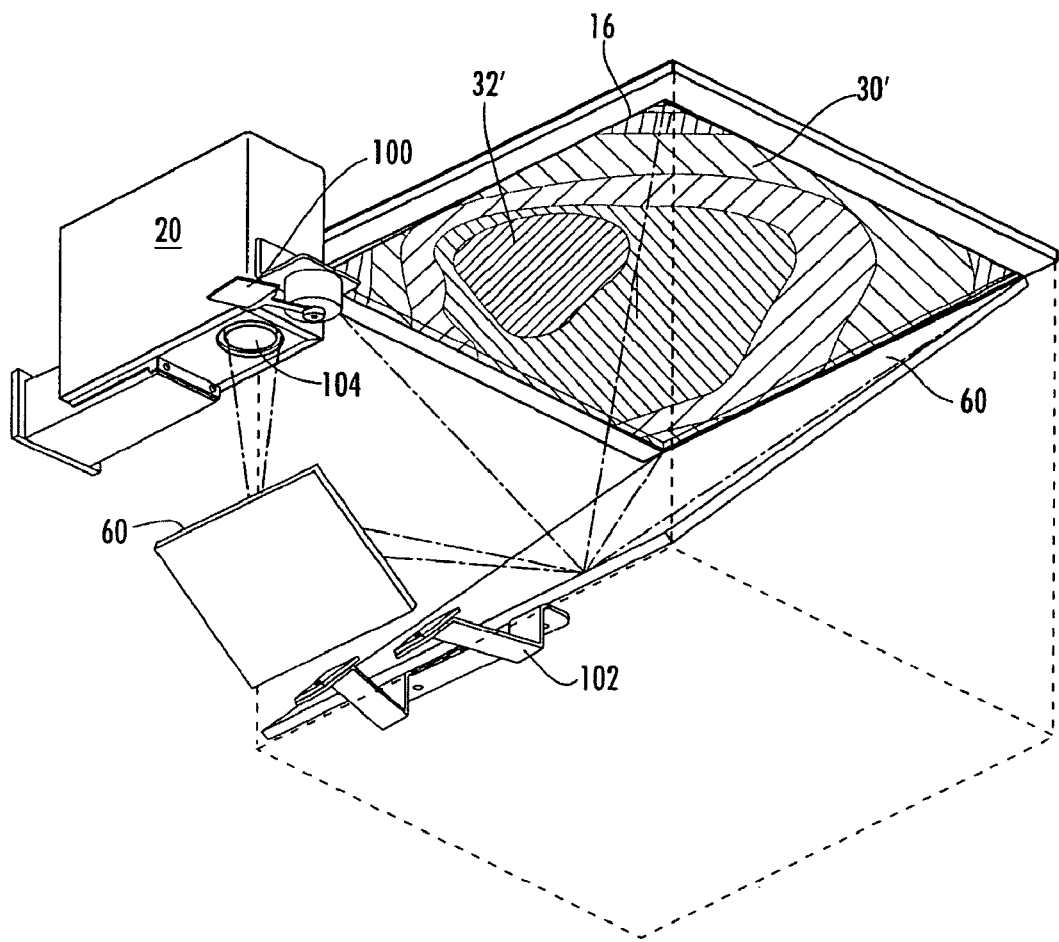
Figure 10B:
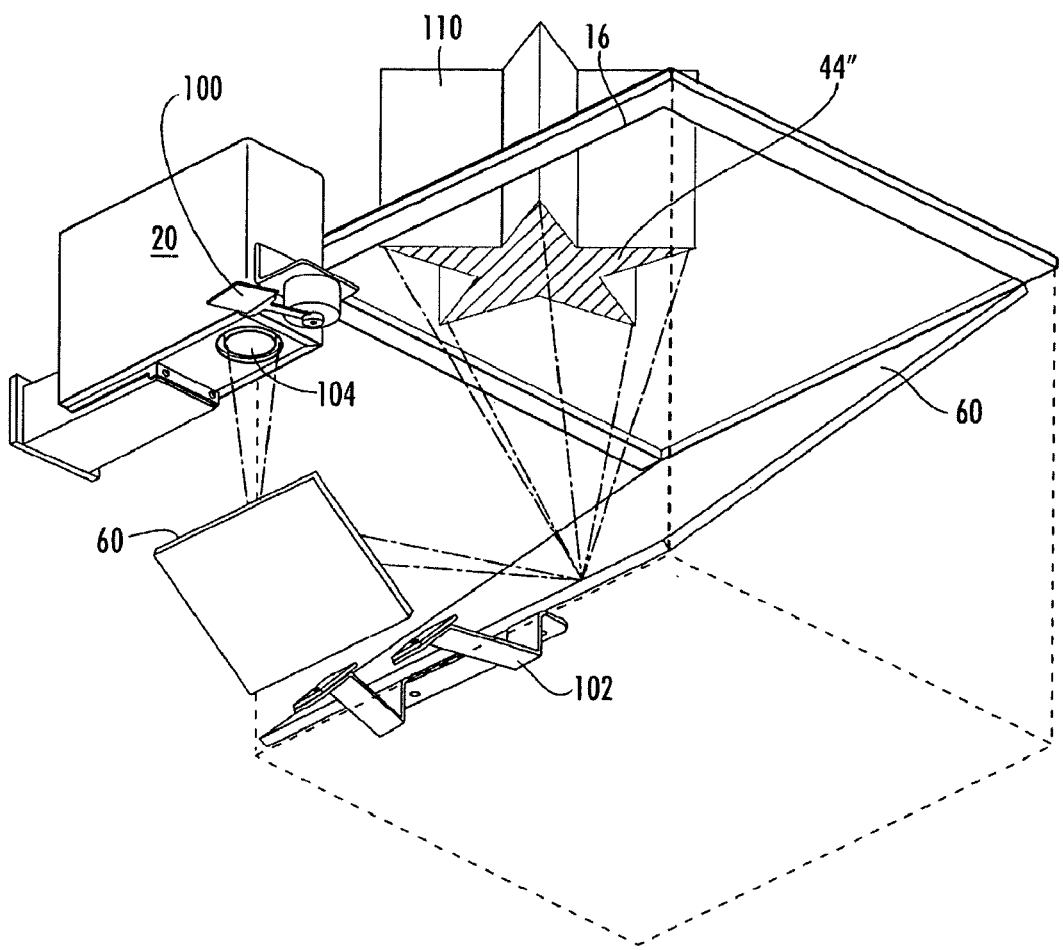
Figure 10C:
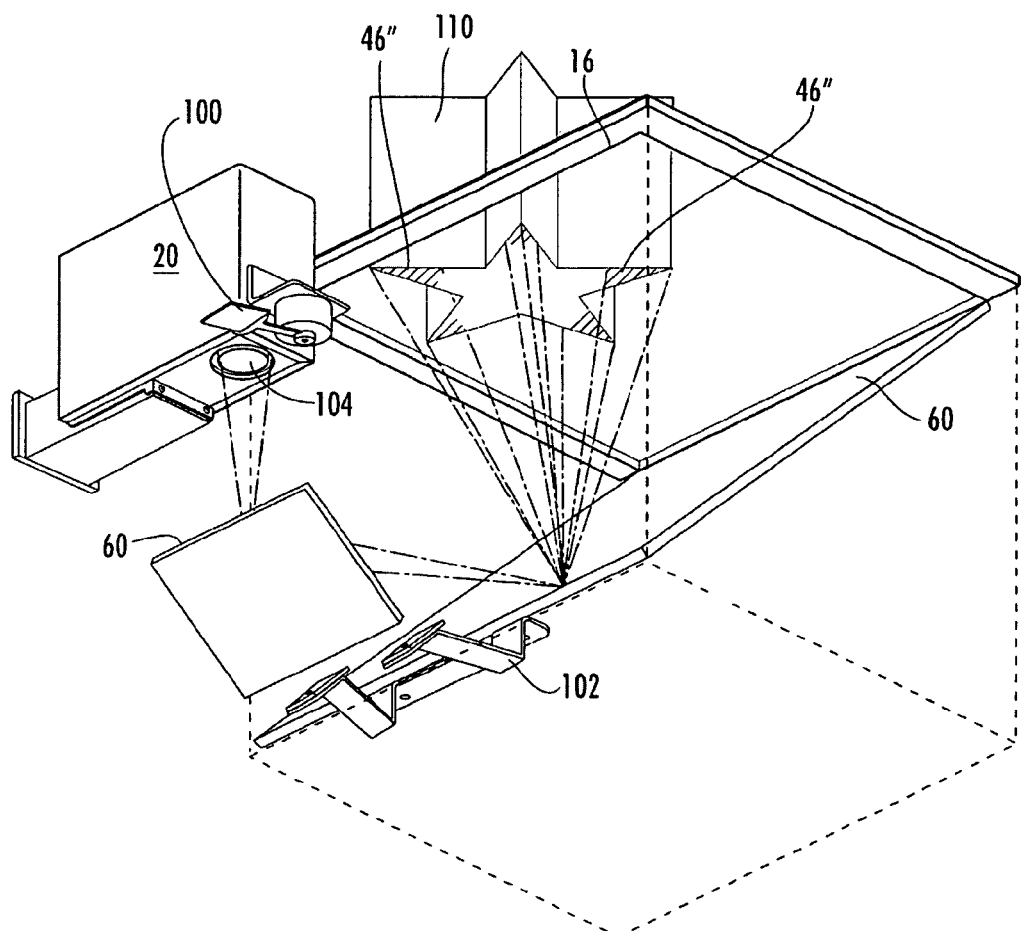

Having thus described the invention in general terms, reference will now be made to the accompanying drawings, which are not necessarily drawn to scale and are meant to be illustrative and not limiting, and wherein:

FIG. 1 is a perspective view of a prior art three-dimensional modeler used to make parts from solidifiable liquid material;

FIG. 2 is a perspective view of a prior art imager and image plane, illustrating the imager projecting a star-shaped pattern of actinic radiation through the image plane to selectively cure a single layer of a solidifiable liquid material;

FIG. 3 illustrates an intensity profile of the actinic radiation projected from an imager in accordance with one embodiment of the invention, wherein the hatched regions define areas of different intensity of actinic radiation (with highest intensity corresponding to the denser hatch and vice versa) and illustrating x- and y-coordinates of the image plane;

FIGS. 4A-4F illustrate a plurality of patterns of actinic radiation projected from the imager in order to selectively cure the entire area of the image plane with a substantially equivalent (or otherwise controlled) amount of actinic radiation per unit of surface area, wherein the patterns substantially correlate to the intensity profile of FIG. 3 to provide for a longer cumulative curing duration in the areas with relatively low intensity as compared to the areas with relatively high intensity;

FIGS. 5A-5C is a perspective view similar to FIG. 2 but illustrating the imager projecting a plurality of patterns that substantially correlate to a determined intensity profile to provide a substantially equivalent (or otherwise controlled) amount of actinic radiation per unit of surface area of the star-shaped pattern of the part being produced by the three-dimensional modeler;

FIGS. 6A-6F illustrate the components and method of determining the intensity profile with a manually-operated sensor assembly, wherein the sensor assembly comprises a radiometer (FIG. 6A) with a probe and filter device (FIG. 6B) that is moved (FIGS. 6C and 6D) along a grid (FIG. 6E) positioned proximate the image plane to determine the actinic radiation intensity data (FIG. 6F) for each section of the grid to determine the intensity profile of the actinic radiation projected from the imager;

FIG. 7 illustrates an alternative technique to determine the intensity profile of the actinic radiation projected from the imager, wherein a sheet (comprising gridlines) of radiation-sensitive material is positioned proximate the image plane (not shown) and exposed to a full exposure of actinic radiation (the entire sheet is exposed for the same amount of time) to represent the actinic radiation intensity across the entire image plane, such that the exposed sheet can be scanned by a scanner to determine the intensity profile of the actinic radiation projected from the imager;

FIG. 8 illustrates yet another alternative technique to determine the intensity profile of the actinic radiation projected from the imager, wherein a scanner is positioned proximate the image plane of the three-dimensional modeler (for example, the prior art modeler of FIG. 1) such that the scanner is exposed to a full exposure of actinic radiation (the entire image plane is exposed for the same amount of time) to determine the intensity profile of the actinic radiation projected from the imager;

FIGS. 9A-9C are perspective views of a diffuser and intensity profiler in accordance with yet another embodiment of the present invention, wherein the diffuser of FIG. 9A is selectively moveable proximate the imager to diffuse the actinic radiation of the imager, the intensity profiler of FIG. 9B comprises two actinic radiation sensors to measure the amount of diffused actinic radiation, and a portion of the three-dimensional-modeler of FIG. 9C illustrating the respective locations of the diffuser and intensity profiler, wherein the diffuser and intensity profiler are adapted to automatically determine the intensity profile of the actinic radiation projected from the imager (by the imager projecting individual sections of a grid and the intensity profiler measuring the diffused actinic radiation) and/or to automatically detect changes over time in the overall intensity and/or changes in the intensity profiler by periodically determining the intensity profile; and FIGS. 10A-10C are perspective views of the operation of the methods and apparatus of one embodiment of the present invention, wherein the determined intensity profile of the actinic radiation projected from the imager is illustrated in FIG. 10A, a portion of the intensity profile defining the highest intensity of the actinic radiation is determined and a center of the part (the star-shaped part) is positioned proximate the portion of the intensity profile defining the highest intensity of the actinic radiation (as opposed to positioning the part in the center of the image plane as is typically done in prior art three-dimensional models), as illustrated in FIG. 10B, and a plurality of patterns (FIGS. 10B and 10C) of actinic radiation are projected by the imager to selectively cure the single layer of the solidifiable liquid material provided proximate the image plane of the modeler, and wherein FIGS. 10B and 10C illustrate the three-dimensional part comprising multiple layers of selectively cured solidifiable liquid material extending opposite the direction from which the actinic radiation is projected onto the image plane from the imager (via the two mirrors).

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the methods and apparatus are described and shown in the accompanying drawings with regard to a three-dimensional modeler utilizing the film transfer imaging technique, it is envisioned that the methods and apparatus of the present invention may be applied to any now known or hereafter devised three-dimensional modeler in which it is desired to cure material with a substantially equivalent (or otherwise controlled) amount of actinic radiation per surface area in order to produce three-dimensional parts. Like numbers refer to like elements throughout.

Imagers of three-dimensional modelers typically have a non-uniform intensity of actinic radiation that is projected along the x- and y-axes of the two-dimensional image plane. FIG. 3 illustrates an intensity profile of the actinic radiation projected from an imager in accordance with one embodiment of the invention. The hatched regions define areas of different intensity of actinic radiation, wherein the highest intensity corresponds to the denser hatch and vice versa. As used herein, "intensity" primarily refers to the energy density of the actinic radiation. The energy density is important because the amount of curing of the solidifiable liquid material is directly related to the amount of energy projected onto the solidifiable liquid material. Accordingly, a portion of a part being produced from the solidifiable liquid material may grow an undesirable amount if exposed to too much energy, thus making the part oversized and/or disproportionate. Conversely, a portion of a part being produced from the solidifiable liquid material may not grow enough if exposed to too little energy, thus making the part undersized and/or having inadequate part strength. Even for parts that are subject to post-processing, such as deep curing of the completed "green" part, such problems of too much energy exposure and/or too little energy exposure can have adverse effects on the final part.

The solidifiable liquid material used with the present invention is any radiation curable composition that is converted from a generally liquid or thixotropic state to a generally solid state when exposed to a certain amount of actinic radiation. Two non-limiting examples of a solidifiable liquid material adapted for use with certain embodiments of the present invention are disclosed in U.S. Pat. No. 7,358,283 and U.S. patent application Ser. No. 12/203,177 filed on Sep. 3, 2008, both of which are assigned to the present assignee, and the disclosures of which are incorporated by reference in their entireties. Further embodiments of the present invention include any generally liquid material that may be solidified by exposure to actinic radiation.

As used herein a "single layer" of solidifiable liquid material can be any amount of material applied in any fashion that is exposed to actinic radiation to selectively cure a portion of the solidifiable liquid material prior to the addition of any new material (the next layer) proximate the image plane. Therefore, a single layer may be defined by multiple individual layers of material if all those layers are exposed to the actinic radiation together. Typically, a single layer of material is provided proximate the image plane, the material is selectively cured and the cured material is removed relative to the image plane while becoming a layer of the part being produced and the uncured material is replaced or supplemented with uncured material to define the next single layer of material.

Referring again to the non-uniform intensity of actinic radiation that is projected along the x- and y-axes of the two-dimensional image plane, such as illustrated in FIG. 3, the intensity of some imagers may be only 25% in the corners of the image plane when compared to the intensity at the center or the middle area of the image plane. As a consequence, the solidifiable liquid material proximate the middle of the image plane will be over-exposed in order for the corner areas to be adequately cured or the solidifiable liquid material proximate the corners will be under-exposed in order for the middle area to properly cured. The present invention measures such differences in the intensity of actinic radiation and compensates for such differences to provide a substantially equivalent amount of actinic radiation per unit of surface area. Certain other embodiments of the present invention provide substantially controlled amounts of actinic radiation (that are not necessarily equivalent) that enable the layers of the part to be cured in a controlled fashion to produce the part as desired.

Referring again to FIG. 3, the intensity profile 30 illustrates the different intensities of actinic radiation using hatched regions 32-42 (the right side of FIG. 3 provides a scale of the respective hatch densities). The region with the highest intensity, region 32, is illustrated with the densest hatch, whereas the region with the lowest intensity, region 42, is illustrated with the least dense hatch. The x-axis of the image plane is illustrated from 0 to 1000, and the y-axis of the image plane is illustrated from 0 to 700; however, image planes of further embodiments of the present invention may comprise axes with any numbering, may comprise any overall size, and/or may comprise any shape. The regions 32-42 are illustrated as having lines between the regions, similar to topography lines on a map; however, it should be appreciated that the regions do not necessarily define a consistent intensity but merely represent a range of intensities such that there is a generally linear relationship in average intensity from the highest intensity in region 32 to the lowest intensity in region 42 without any substantial changes at the lines between regions. In the illustrative embodiment of FIG. 3, the region of highest intensity, region 32, is generally centered along the x-axis and slightly below center along the y-axis; however, the intensity profiles of other three-dimensional modelers in accordance with the present invention may define any relative orientations, sizes, distribution, etc. of the regions of intensity.

The methods and apparatus of the present invention enable the intensity profile to be determined (as discussed more fully below) and the determined intensity profile to be used to improve the production of the part. FIGS. 4A-4F illustrate how the determined intensity profile of FIG. 3 may be used to improve the production of the part using the three-dimensional modeler. As opposed to conventional three-dimensional modelers that project a single two-dimensional pattern onto a layer of solidifiable liquid material to selectively cure the material in the shape of the two-dimensional pattern, the methods and apparatus of the present invention project a plurality of patterns onto the layer of solidifiable liquid material to selectively cure the material in the shape of the two-dimensional pattern. In FIGS. 4A-4F, the two-dimensional pattern being selectively cured is the entire surface area of the image plane, for illustrative purposes, but a more practical use of the plurality of patterns is also illustrated in FIGS. 5A-5C discussed below.

In order to selectively cure the entire amount of solidifiable liquid material proximate the image plane in FIGS. 4A-4F with a substantially equivalent (or otherwise controlled) amount of actinic radiation per unit of surface area of the solidifiable liquid material, the intensity profile 30 illustrated in FIG. 3 must be determined (as discussed below). Once the intensity profile 30 is determined, the control system of the three-dimensional modeler controls the imager to project a plurality of patterns that are substantially correlated to the intensity profile of the actinic radiation. As used herein, "correlate" means that the shapes of the individual patterns of the plurality of patterns depend in part upon the determined intensity profile. Correlation does not necessarily mean that the patterns of the actinic radiation correspond exactly to the regions of the intensity profile, as shown in FIGS. 4A-4F (relative to FIG. 3); correlation simply means that the intensity profile is taken into consideration when shapes of the individual patterns of the plurality of patterns are selected (preferably automatically, but also possibly manually) for the layers of the part to be produced with the three-dimensional modeler.

Figure 4A:
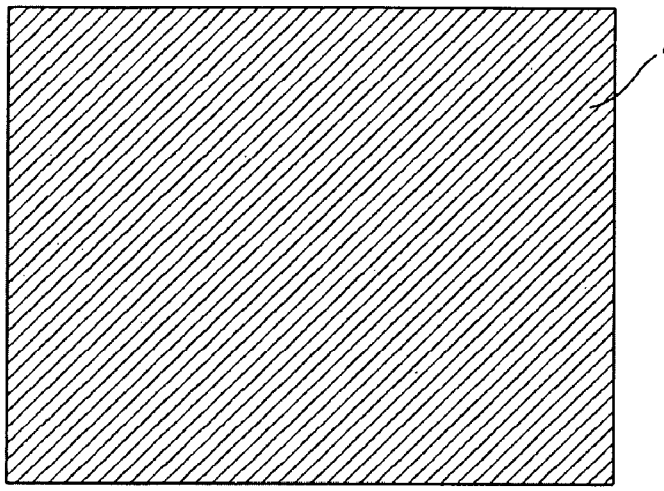

The plurality of patterns of FIG. 4A-4F are projected onto the layer of solidifiable liquid material proximate the image plane to expose the material to a substantially equivalent (or otherwise controlled) amount of actinic radiation per unit of surface area of the solidifiable liquid material. The pattern 44 of actinic radiation of FIG. 4A is substantially the entire two-dimensional area of the image plane, as the cross-sectional area of the part (or at least the single layer of the part) being produced in FIGS. 4A-4F is the entire two-dimensional area of the image plane. The pattern 44 is projected onto the image plane a sufficient amount of time, for example between three and ten seconds, to adequately cure (to generally cure the area the predetermined amount in order to produce the desired part) the material corresponding to region 32 (see FIG. 3) of the intensity profile 30.

Figure 4B:
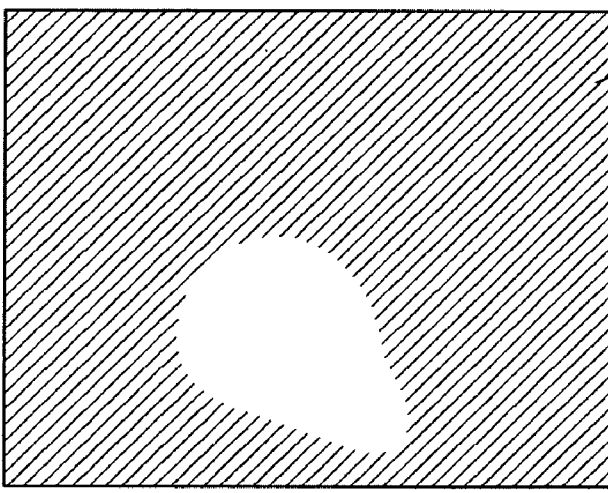
Figure 4C:
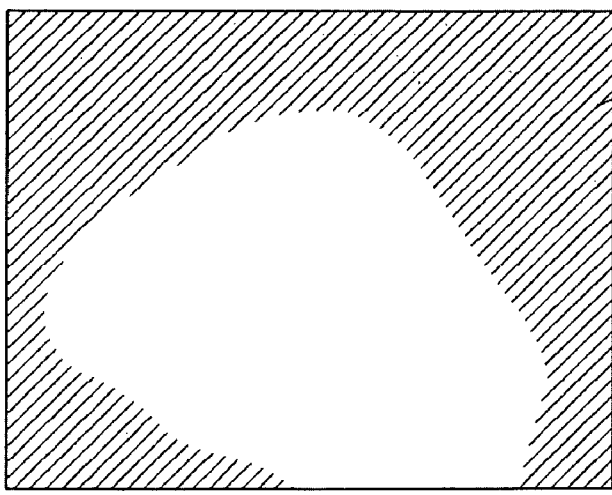

The next pattern in the plurality of patterns of actinic radiation projected onto the solidifiable liquid material proximate the image plane is pattern 46 of FIG. 4B (the actinic radiation is represented by the hatched area and a lack of actinic radiation is represented by a lack of hatch). Pattern 46 is projected a sufficient amount of time, for example less than one second, to adequately cure the material corresponding to region 34 (see FIG. 3) of the intensity profile 30. Because region 34 is exposed to actinic radiation during pattern 44, the amount of time that pattern 46 is projected onto the material is based upon the amount of additional actinic radiation region 34 needs so that region 34 is exposed to a substantially equivalent amount of actinic radiation per unit of surface area as region 32. In other words, the amount of time pattern 46 is projected corresponds to the difference in intensities of regions 32 and 34 of the intensity profile of FIG. 3.

Because the intensities of regions such as regions 32 and 34 are average intensities for the respective region, it should be appreciated that not every point in regions 32 and 34 are exposed to the exact same amount of actinic radiation. However, various embodiments of the present invention base the number of patterns in the plurality of patterns, the projection time of the patterns of the plurality of patterns, and other parameters in an attempt to project substantially equivalent amounts of actinic radiation per unit of surface area. Accordingly, it should be appreciated that a general relationship between the number of patterns in the plurality of patterns (for a given layer of the part) and the equivalence in actinic radiation exists such that providing a greater number of patterns provides improved equivalence in actinic radiation exposure and vice versa. Still further relationships between the various parameters would be appreciated by those skilled in the art and are included within the scope of the present invention.

Figure 4D:
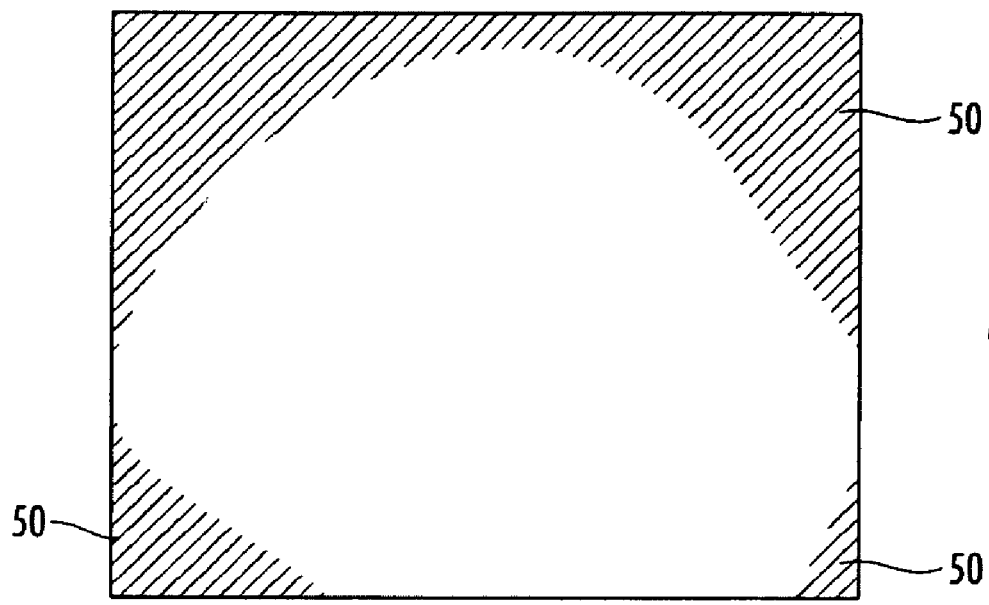
Figure 4E:
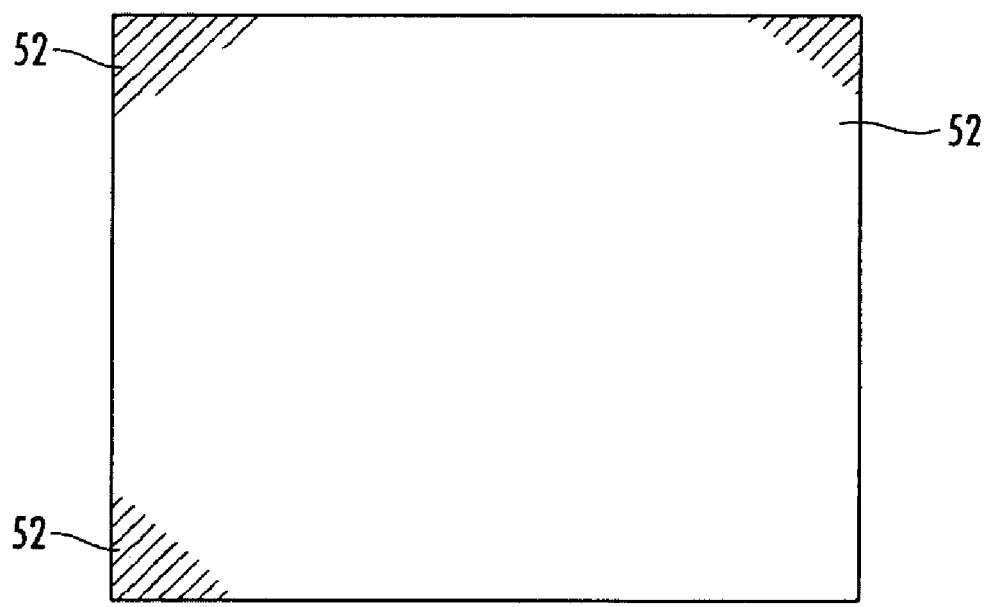
Figure 4F:
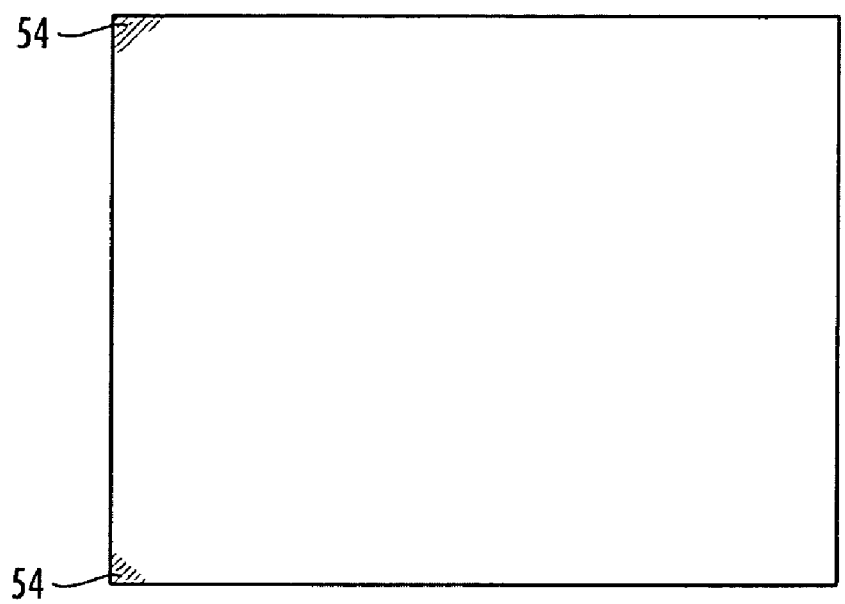

Returning again to FIG. 3 and FIGS. 4A-4F, pattern 48 of FIG. 4C is the next pattern (following pattern 46 of FIG. 4B) in the plurality of patterns of actinic radiation projected onto the solidifiable liquid material proximate the image plane. Pattern 48 is projected a sufficient amount of time to adequately cure the material corresponding to region 36 (see FIG. 3) of the intensity profile 30 in a similar fashion as discussed above with respect to pattern 46. Similarly, pattern 50 of FIG. 4D is the next pattern to adequately cure region 38; pattern 52 of FIG. 4E is the next pattern to adequately cure region 40; and pattern 54 of FIG. 4F is the next pattern to adequately cure region 42. Accordingly, the entire layer of solidifiable material is cured with a substantially equivalent amount of actinic radiation per unit of surface area with an imager that projects the intensity profile of FIG. 3 that does not define a substantially equivalent amount of actinic radiation (intensity) per unit of surface area.

Turning now to FIGS. 5A-5C, a method of producing a star-shaped cross-sectional area of a part is illustrated. After the intensity profile of imager 20 has been determined, the control system of the, three-dimensional modeler (with or without human intervention) determines that a certain number patterns should be projected to adequately cure the star-shaped area out of the solidifiable liquid material 12 provided opposite the image plane 16 from the mirrors 60 and imager 20. In the illustrated embodiment of FIGS. 5A-5C, three patterns define the plurality of patterns to be projected for the single layer of solidifiable liquid material. FIG. 5A illustrates the projecting of pattern 44' (onto the image plane via one or more mirrors 60) having a shape of the entire star-shaped cross-sectional area of the part being produced. FIG. 5B illustrates the projecting of pattern 46', which is the star-shaped pattern of pattern 44' minus a region of highest intensity (comparable to intensity region 32 of FIG. 3). FIG. 5C illustrates the projecting of pattern 48', which is the star-shaped pattern of pattern 44' minus the two regions of highest intensity (comparable to intensity regions 32 and 34 of FIG. 3). Accordingly, FIGS. 5A-5C illustrate the projecting of actinic radiation in a plurality of patterns to selectively cure a single layer of solidifiable liquid material. The phrase "projecting the actinic radiation in a plurality of patterns to selectively cure the single layer of the solidifiable liquid material" is defined as chronologically projecting two or more different patterns of actinic radiation on a single layer of solidifiable liquid material, similar to the chronology of patterns illustrated in FIGS. 4A-4F, in FIGS. 5A-5C, and in FIGS. 10B-10C. Still further embodiments of the present invention use the methods and apparatus of this invention to produce parts having a variety of shapes and/or using alternative numbers of different patterns to define the plurality of patterns for a single layer of material.

Having described the methods of using the determined intensity profile 30 to improve the production of parts using a plurality of patterns for a layer of material, FIGS. 6A-10C are provided to illustrate methods and apparatus for determining the intensity profile. Further embodiments of the present invention include additional methods and apparatus for determining the intensity profile.

Figures 6E, 6F:
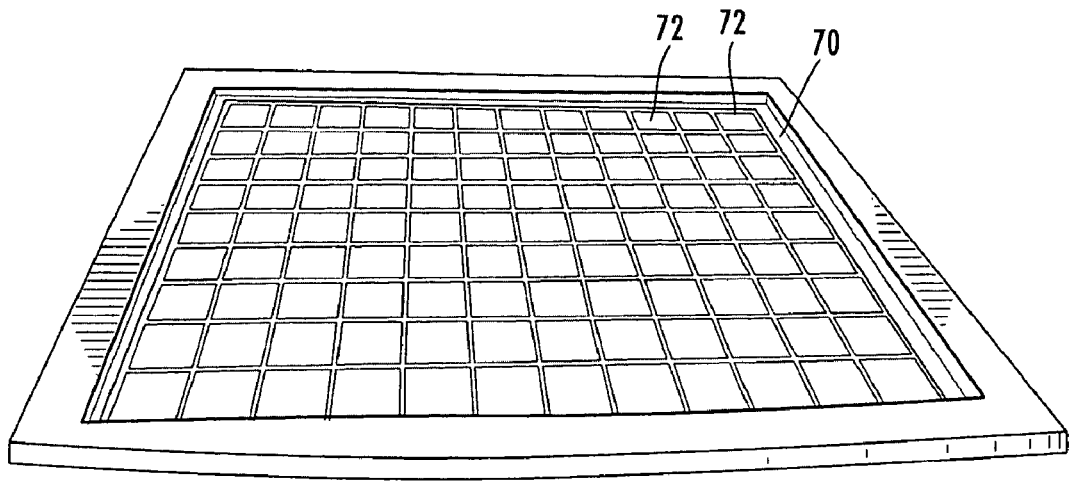

FIGS. 6A-6F illustrate a first apparatus and associated method for determining the intensity profile of the actinic radiation with a manually-operated sensor assembly 62. The sensor assembly 62 of FIG. 6A comprises a radiometer having a probe 64 and a filter device 66, wherein the probe comprises any type of actinic radiation sensor. The sensor assembly also comprises a display unit 68 used in conjunction with the probe to display the values of actinic radiation to the operator for the operator to manually record the values. FIG. 6B illustrates the probe 64 inserted into the filter device 66, such that the filter device filters the actinic radiation measured by the probe. FIGS. 6C and 6D illustrate an operator moving the probe 64 (along with filter device 66) along a grid 70 that defines a plurality of grid sections 72. FIG. 6E illustrates the grid that is placed proximate the image plane 16 of the three-dimensional modeler 10, wherein the grid of FIG. 6E defines 9×12 (108 total) grid sections for the operator to measure. In the illustrated embodiment, the operator measures each grid section twice, once with the probe oriented a first direction (for example, in FIG. 6C) and a second time with the probe oriented a second direction (for example, in FIG. 6D in a position that is 180 opposite the position of FIG. 6C).

The operator records all of the measured values of actinic radiation intensity data, such as on a chart as in FIG. 6F, that is averaged and entered into the control system for the three-dimensional modeler, such that the modeler, or other software used in conjunction with the three-dimensional modeler control system, is able to determine the intensity profile 30. The two values for each grid section are preferably averaged to provide a more accurate representation of the intensity profile; however, further embodiments of the present invention may utilize each individual value and/or may provide more or less grid sections to provide more or less resolution to the determined intensity profile.

Turning now to a second apparatus and associated method for determining the intensity profile of the actinic radiation, FIG. 7 illustrates a sheet 80, comprising gridlines 82 of radiation-sensitive material, that has been exposed to the actinic radiation for a certain duration of time. The sheet is sensitive to light or other actinic radiation such that the sheet changes color or shade of color (for example, with grey-scaling) in response to being exposed to an amount of energy. In the illustrated embodiment, the sheet 80 is positioned proximate the image plane (such as the image plane 16 of FIG. 1) and exposed to a full exposure of actinic radiation, such that the entire sheet is exposed for the same amount of time. The sheet 80 then changes color, shade, or the like to represent the actinic radiation intensity across the entire image plane, thus depicting the intensity profile. For illustrative purposes, the intensity profile illustrated on the sheet 80 of FIG. 7 depicts the intensity profile 30 of FIG. 3, wherein regions 82-92 of FIG. 7 correspond to regions 32-42, respectively (though it should be appreciated that the boundary lines between regions would likely not appear on the sheet 80 for the reasons described above with respect to FIG. 3). The exposed sheet 80 may then be scanned using a conventional scanner and software capable of taking the scanned colors, shades, or the like and determining the intensity profile therefrom.

One advantage of the apparatus and method of FIG. 7 is that it would allow determination of the intensity profile after the end user has taken possession of the three-dimensional modeler and without the need for a field engineer to travel to the location of the three-dimensional modeler. Whereas the apparatus and method of FIGS. 6A-6F are preferably used/performed prior to, during, or immediately after the assembly of the three-dimensional modeler or are used/performed by a trained field engineer servicing a used three-dimensional modeler, the apparatus and method of FIG. 7 may be performed in part by the end user. The end user would receive (from the organization responsible for servicing the modeler) at least one sheet 80 of radiation-sensitive material with instructions to place the sheet on the image plane and have the imager project a full exposure of actinic radiation for a certain duration of time. Once the sheet 80 has been exposed a sufficient amount, the end user could simply mail the sheet to the organization responsible for servicing the modeler, and the organization would scan the sheet to determine the intensity profile and then remotely communicate (via the internet, wireless device, or other communication device) the intensity profile to the three-dimensional modeler to effectively calibrate and/or re-calibrate the modeler with the intensity profile data. Still further advantages are achieved by the various apparatus and methods of the present invention.

Yet another apparatus and method for determining the intensity profile of the actinic radiation projected from the imager is illustrated in FIG. 8. A scanner device 96 can be placed directly on the image plane, with the radiation-sensitive portion (not shown) facing the direction of the actinic radiation. Accordingly, the embodiment of FIG. 8 effectively eliminates the intermediate sheet of FIG. 7, such that the scanner device 96 directly measures the projected actinic radiation to determine the intensity profile. The determined intensity profile may subsequently be communicated (either directly or indirectly) to the three-dimensional modeler to effectively calibrate and/or re-calibrate the modeler with the intensity profile data. The scanner can measure the projected actinic radiation directly (such as described above) or indirectly (such as by using a diffuser in a manner similar to the method described below with respect to FIGS. 9A-9C or by using other radiation redirecting or filtering devices).

Turning now to the apparatus and method of FIGS. 9A-9C, a diffuser 100 and intensity profiler 102 are provided to allow automatic determinations of the intensity profile of actinic radiation projected by the imager 20. The diffuser 100 of FIG. 9A is rotatably attached proximate the imager 20, such that the diffuser is selectively moveable to be positioned in front of the lens 104 of the imager. The diffuser 100 diffuses the actinic radiation of the imager 20, such that the actinic radiation is generally scattered relative to its undiffused trajectory. The intensity profiler 102 of FIG. 9B comprises two actinic radiation sensors 106 (further embodiments comprise at least one actinic radiation sensor) that measure the actinic radiation, in particular the diffused actinic radiation. FIG. 9C shows the relative positioning of the diffuser and intensity profiler relative to the other components of the three-dimensional modeler. The diffuser and intensity profiler of this exemplary embodiment are adapted to be permanently attached to the three-dimensional modeler, unlike the previously discussed embodiments. Accordingly, it is desirable, though not necessary, that the diffuser and/or intensity profiler not be positioned in a way that would adversely affect the projection of actinic radiation during the normal operation of the three-dimensional modeler.

As shown in FIG. 9C, the diffuser is rotatably attached proximate the imager 20, and the intensity profiler 102 is mounted generally between the two mirrors 60, but in such a way that the intensity profiler does not interfere with the normal projection of actinic radiation from the imager to the image plane. As the intensity profiler 102 does not directly measure the projected actinic radiation due to its position, the diffuser 100 is selectively positioned over the lens 104 of the imager 20 to diffuse the projected actinic radiation so that a portion of the actinic radiation is directed to one or both of the actinic radiation sensors 106 of the intensity profiler 102.

Further embodiments include alternative methods and/or intensity profilers for sensing the actinic radiation to determine the intensity profile.

In order to determine the intensity profile, the diffuser 100 is positioned in front of lens 104 of imager 20 (as shown in phantom in FIG. 9A). The imager 20 then projects small regions of actinic radiation, such as square or rectangular grid sections comparable to the grid sections of FIGS. 6E and 7, sequentially in such a way that the intensity profiler 102 is able to measure the amount of diffused radiation corresponding to each projected grid section of actinic radiation and transfer such measurements to the control system of the three-dimensional modeler. After the imager 20 has projected all of the grid sections, or certain representative grid sections, of actinic radiation, the measurements from the intensity profiler 102 of FIG. 9C may be used (in an automated manner comparable to the use of the chart of FIG. 6F) by the control system of the three-dimensional modeler to determine the intensity profile. Because of the fully automated nature of this method of FIGS. 9A-9C, the method may be performed at any time without any assistance from a field engineer or an end user. Therefore, this method can provide periodic determinations of the intensity profile to continuously recalibrate the modeler by updating the plurality of patterns per layer as the intensity profile changes over time and/or as the overall intensity diminishes over time. Still further embodiments of the present invention include additional and/or alternative method and apparatus for determining the intensity profile of the actinic radiation projected from the imager.

Turning now to FIGS. 10A-10C, additional methods and apparatus of the present invention are disclosed, wherein the part is positioned to be proximate the portion of the intensity profile defining the highest intensity of actinic radiation. By purposefully positioning the part where the greatest intensity of radiation is available, many (if not all) layers of the part may be produced more quickly using the relatively higher intensity radiation. FIG. 10A represents a three-dimensional modeler in which the intensity profile 30' defines a region 32' of highest intensity (comparable to the region 32 of FIG. 3) that is offset in both the x-axis and the y-axis. After the intensity profile has been determined using the method(s) and/or apparatus of the present invention, such as with the diffuser 100 and intensity profiler 102, the control system of the three-dimensional modeler positions a center of the part to be produced proximate a portion (region 32') of the intensity profile defining the highest intensity of the actinic radiation.

FIG. 10B illustrates the center of the part 110 as being positioned proximate the region 32' rather than in the center or in a corner or side, which are often the default positions for parts. If multiple individual parts are being produced simultaneously, the parts may be oriented in such a way that the center of the collective parts (also call the part herein) is positioned proximate a portion (region 32') of the intensity profile defining the highest intensity of the actinic radiation. It should also be appreciated that the center of the part is generally determined based upon all of the layers of the part, as parts may have many different layers that define different centers, so the average center is preferably used for such parts. Because the part is positioned where the highest intensity is available, it is likely that the part may be selectively cured more quickly as compared to the same part being positioned in a default position that did not define the highest intensity of the actinic radiation. FIG. 10B illustrates the projections of a first pattern 44" of the plurality of patterns, and FIG. 10C illustrates a second pattern 46" of the plurality of patterns (additional patterns may also be projected depending upon the intensity profile). Because the cure time for each layer is generally governed by the lowest intensity of any area to be cured for that particular layer, the speed of production can be increased by positioning the part proximate the highest intensity.

Accordingly, the present invention provides for the production of three-dimensional parts having superior part quality and/or with faster build times relative to parts produced by conventional methods and apparatus. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

That which is claimed:

1. A method of producing a part using a three-dimensional modeler, wherein the modeler produces the part by selectively curing layers of a solidifiable liquid material with actinic radiation projected from an imager, the method comprising:
   determining an intensity profile of the actinic radiation projected from the imager;
   providing a single layer of the solidifiable liquid material proximate an image plane of the modeler;
   projecting the actinic radiation in a plurality of patterns to selectively cure the single layer of the solidifiable liquid material, wherein the patterns are substantially correlated to the intensity profile of the actinic radiation;
   providing a single layer of the solidifiable liquid material proximate the image plane of the modeler; and
   repeating the projecting of actinic radiation and the providing of a single layer to produce the part.

2. A method in accordance with claim 1, wherein determining the intensity profile comprises measuring the actinic radiation at a position comprising at least one of between the imager and the image plane, proximate the image plane, and opposite the image plane from the imager.

3. A method in accordance with claim 1, wherein determining the intensity profile comprises measuring the actinic radiation with a manually-operated sensor proximate the image plane.

4. A method in accordance with claim 1, wherein determining the intensity profile comprises:
   exposing an actinic radiation-sensitive material to an amount of actinic radiation;
   scanning the exposed actinic radiation-sensitive material; and
   using the scanned data to determine the intensity profile.

5. A method in accordance with claim 1, wherein determining the intensity profile comprises measuring the actinic radiation with a scanner device removably positioned proximate the image plane.

6. A method in accordance with claim 1, wherein determining the intensity profile comprises measuring the actinic radiation projected from the imager prior to installation of the imager into the three-dimensional modeler.

7. A method in accordance with claim 1, wherein determining the intensity profile comprises using at least one intensity profiler to measure diffused actinic radiation projected from the imager.

8. A method in accordance with claim 1, wherein projecting the actinic radiation in a plurality of patterns comprises projecting patterns for different durations.

9. A method in accordance with claim 1, wherein projecting the actinic radiation in a plurality of patterns comprises correlating the number of patterns to a difference in intensity between a highest intensity and a lowest intensity of the intensity profile.

10. A method in accordance with claim 1, wherein projecting the actinic radiation in a plurality of patterns comprises correlating the shape of individual patterns of the plurality of patterns to the intensity profile.

11. A method in accordance with claim 1, wherein the solidifiable liquid material of the single layer that is selectively cured by the actinic radiation is cured with a substantially equivalent amount of actinic radiation per unit of surface area.

12. A method in accordance with claim 1, wherein projecting the actinic radiation is substantially free of grey-scaling to compensate for different intensities of the intensity profile.

* * * * *